SILICON DIODE ERROR DETECTOR

Filed Sept. 23, 1955

INVENTOR.
WILLIAM H. WOODWORTH
BY [signature]
[signature]
ATTORNEYS

United States Patent Office 2,864,053

Patented Dec. 9, 1958

2,864,053

SILICON DIODE ERROR DETECTOR

William H. Woodworth, China Lake, Calif., assignor to the United States of America as represented by the Secretary of the Navy Application September 23, 1955, Serial No. 536,322

4 Claims. (Cl. 323—69)

(Granted under Title 35, U. S. Code (1952), sec. 266)

The invention described herein may be manufactured and used by or for the Government of the United States of America for governmental purposes without the payment of any royalties thereon or therefor.

The present invention relates to an electrical error detector and more particularly to a voltage or current error detector using a silicon diode.

The present invention is for sensing the absolute value of a D. C. voltage and for providing a current or voltage output which will indicate by its magnitude and polarity the deviation of the sensed voltage from the design value. The error detector consists of, substantially, a Wheatstone bridge with a non-linear arm; in this case the non-linear arm is a silicon diode. The present invention provides a reliable and accurate error detector, and may be used to control a power amplifier so as to form a constant voltage or current source. Previous methods and devices for performing these functions are many and varied. Former devices using non-linear arms in Wheatstone bridges, made use of incandescent lamps, thyrite resistors, germanium or selenium diodes and many other elements. All the previous devices which made use of a non-linear circuit element have been subject to time instability, slow response, lack of physical strength and insufficient non-linearity.

An object of the invention, therefore, is to provide an improved voltage or current error detector having high reliability and reproducibility.

Another object of the invention is to provide an electrical error sensing device which is mechanically rugged and has greater error sensitivity.

A further object of the invention is to provide a voltage or current error detector having a wide temperature range over which satisfactory operation may be obtained, and which has simplicity in temperature compensation.

Other objects and many of the attendant advantages of this invention will be readily appreciated as the same become better understood by reference to the following detailed description when considered in connection with the accompanying drawings wherein.

The present invention makes use of the peculiar characteristics of a silicon diode when operating in the back direction. At a certain back voltage a silicon diode, by virtue of its physical characteristics, changes its dynamic resistance from many meg-ohms to a value of a few ohms. This transition point is technically called the Zener point, or Zener voltage. When operated beyond the Zener voltage, it can be seen that the silicon diode has extremely non-linear characteristics. That is, its back resistance goes from many meg-ohms to practically zero. Moreover, the characteristics of the diode are extremely stable and well behaved over a wide temperature range.

Figure 1:
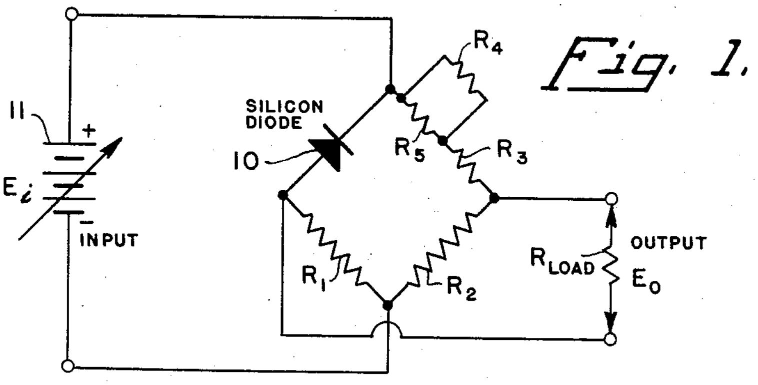
Fig. 1 is a schematic diagram of a silicon diode error detector.

Therefore, if this very non-linear element, the silicon diode 10, is placed in a Wheatstone bridge, Fig. 1, and thus becomes one arm of the bridge, it will be possible to null the output of the bridge for only one value of input voltage. Any other value of input voltage will cause an output which is then an error signal.

Figure 2:
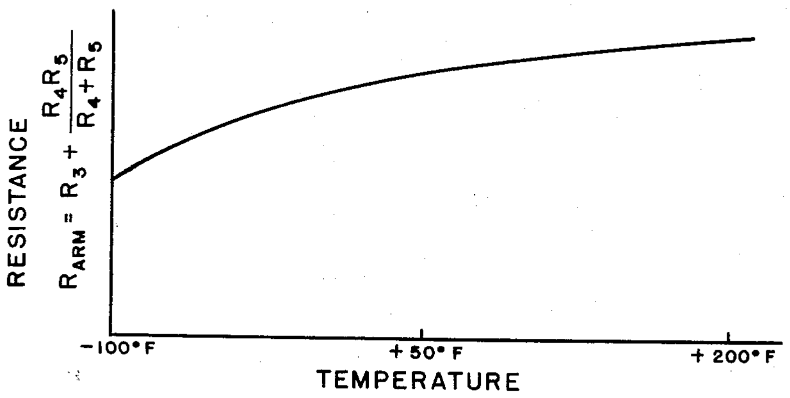
Fig. 2 is a curve showing the temperature characteristic of temperature vs. the total resistance of the bridge arm containing a temperature compensating resistor.

The electrical diagram of the silicon diode error detector, illustrated in Fig. 1, shows a variable D. C. source 11, at the input, for convenience only; and in the bridge portion of the circuit are shown resistors $R_1$, $R_2$, $R_3$ and $R_4$ which are precision, zero temperature coefficient resistors. The resistor $R_5$ is a temperature compensating resistor placed in one arm in series with resistor $R_3$ as shown; it is made of positive coefficient material, such as copper or Balco. The resistor $R_4$ is placed in the arm shunting $R_5$ to give the temperature characteristic a slight curvature so that it will more closely approximate the actual requirements, see Fig. 2. The position relationship, in the bridge circuit, between silicon diode 10 and temperature compensating resistor $R_5$, as illustrated in Fig. 1, is critical in matching the desired resistance-temperature curve. The curve of Fig. 2 shows the temperature characteristic of resistance $R_{arm}$ vs. temperature, where $$R_{\text{arm}} = R_3 + \frac{R_4 R_5}{R_4 + R_5}$$

Using this circuit (Fig. 1), the device may be temperature compensated to within plus or minus .05 percent over the temperature range of minus 100 degrees Fahrenheit to plus 200 degrees Fahrenheit. That is, the input voltage $E_1$ which will make the output voltage $E_0$ zero, does not vary more plus or minus .05 percent, over the temperature range specified. However, by using a temperature compensating silicon diode, a temperature compensating resistor $R_5$ would not be needed in the circuit. The resistance $R_{Load}$ in Fig. 1 represents the resistance of equipment across the output terminals of the error detector.

Figure 3:
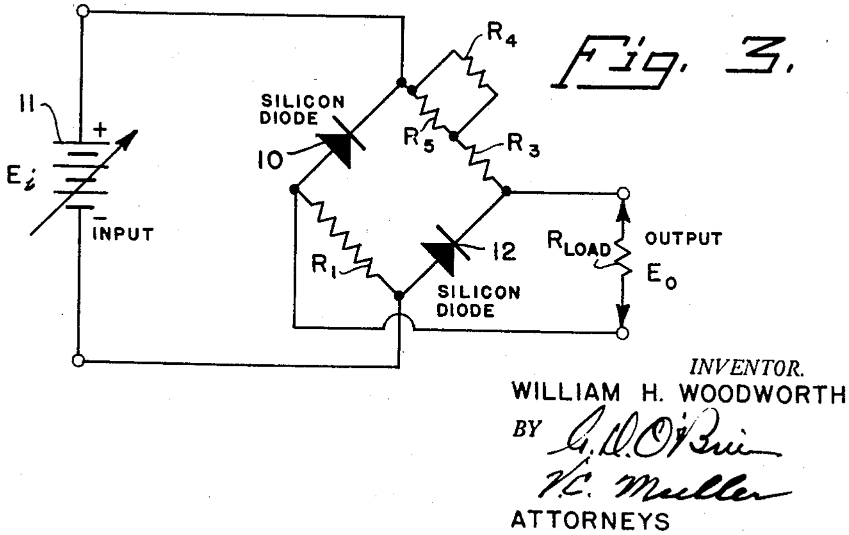
Fig. 3 is a modification of the error detector of Figure 1.

Another method of construction would be to replace the resistance $R_2$, Fig. 1, in one arm of the bridge, with another silicon diode 12, as ilustrated in Fig. 3. This would result in an increase in the sensitivity of the device.

Obviously many modifications and variations of the present invention are possible in the light of the above teachings. It is therefore to be understood that within the scope of the appended claims the invention may be practiced otherwise than as specifically described.

What is claimed is:

1. An error detector consisting of a bridge circuit composed of a first arm comprising a silicon diode, a second arm comprising a first resistance, one end of said second arm being connected to one end of said first arm at a first junction, a third arm comprising a second resistance, one end of said third arm being connected to the other end of said second arm at a second junction, a fourth arm comprising third, fourth and fifth resistances, said fourth and fifth resistances being connected in parallel and said third resistance being connected in series with said parallel fourth and fifth resistances, said first, second, third and fourth resistances being precision zero temperature coefficient resistors, and said fifth resistance being a temperature compensating resistor, one end of said fourth arm being connected to the other end of said third arm at a third junction and the other end of said fourth arm being connected to the other end of said first arm at a fourth junction; output terminals being connected to said first and third junctions; a variable D. C. input voltage source connected across said second and fourth junctions, said silicon diode connected in said first arm so as to oppose the flow of current when said input voltage is applied, and the values of the resistors in the second, third and fourth arms being such that the magnitude and polarity of the output voltage between said first and third junctions is a function of the direction and magnitude of deviation of the input voltage from a preselected value, said error detector being temperature compensated to within plus or minus .05 percent variance in input voltage for zero output voltage over the temperature range of minus 100 degrees Fahrenheit to plus 200 degrees Fahrenheit, the output of said bridge circuit being null for only one value of input voltage, any other value of input voltage other than said one value of input voltage causing an output which is an error signal.

2. An error detector consisting of a bridge circuit composed of a first arm comprising a first silicon diode, a second arm comprising a first resistance, one end of said second arm being connected to one end of said first arm at a first junction, a third arm comprising a second silicon diode, one end of said third arm being connected to the other end of said second arm at a second junction, a fourth arm comprising second, third and fourth resistances, said third and fourth resistances being connected in parallel and said second resistance being connected in series with said parallel third and fourth resistances, said first, second and third resistances being precision zero temperature coefficient resistors, and said fourth resistance being a temperature compensating resistor; one end of said fourth arm being connected to the other end of said third arm at a third junction and the other end of said fourth arm being connected to the other end of said first arm at a fourth junction; output terminals being connected to said first and third junctions; a variable D. C. input voltage source connected across said second and fourth junctions, said silicon diodes being connected in the first and third arms so as to oppose the flow of current when said input voltage is applied, and the values of the resistors in the second and fourth arms being such that the magnitude and polarity of the output voltage between said first and third junctions is a function of the direction and magnitude of deviation of the input voltage from a preselected value; said error detector being temperature compensated to within at least plus or minus .05 percent variance in input voltage for zero output voltage over the temperature range of minus 100 degrees Fahrenheit to plus 200 degrees Fahrenheit, the output of said bridge circuit being null for only one value of input voltage, any other value of input voltage other than said one value of input voltage causing an output which is an error signal.

3. A voltage or current error detector consisting of a bridge circuit composed of a first arm comprising a temperature compensating silicon diode, a second arm comprising a first resistance, one end of said second arm being connected to one end of said first arm at a first junction, a third arm comprising a second resistance, one end of said third arm being connected to the other end of said second arm at a second junction, a fourth arm comprising a third resistance, one end of said fourth arm being connected to the other end of said third arm at a third junction and the other end of said fourth arm being connected to the other end of said first arm at a fourth junction, said first, second, and third resistances being precision zero temperature coefficient resistors; output terminals being connected to said first and third junctions; a variable D. C. input voltage source connected across said second and fourth junctions, said temperature compensating silicon diode connected in said first arm so as to oppose the flow of current when said input voltage is applied, and the values of the resistors in the second, third and fourth arms being such that the magnitude and polarity of the output voltage between said first and third junctions is a function of the direction and magnitude of deviation of the input voltage from a preselected value, said error detector being temperature compensated to within plus or minus .05 percent variance in input voltage for zero output voltage over the temperature range of minus 100 degrees Fahrenheit to plus 200 degrees Fahrenheit, the output of said bridge circuit being null for only one value of input voltage, any other value of input voltage other than said one value of input voltage causing an output which is an error signal.

4. A voltage or current error detector consisting of a bridge circuit composed of a first arm comprising a first temperature compensating silicon diode, a second arm comprising a first resistance, one end of said second arm being connected to one end of said first arm at a first junction, a third arm comprising a second temperature compensating silicon diode, one end of said third arm being connected to the other end of said second arm at a second junction, a fourth arm comprising a second resistance, one end of said fourth arm being connected to the other end of said third arm at a third junction and the other end of said fourth arm being connected to the other end of said first arm at a fourth junction, said first and second resistances being precision zero temperature coefficient resistors; output terminals being connected to said first and third junctions; a variable D. C. input voltage source connected across said second and fourth junctions, said temperature compensating silicon diodes being connected in the first and third arms so as to oppose the flow of current when said input voltage is applied, and the values of the resistors in the second and fourth arms being such that the magnitude and polarity of the output voltage between said first and third junctions is a function of the direction and magnitude of deviation of the input voltage from a preselected value, said error detector being temperature compensated to within at least plus or minus .05 percent variance in input voltage for zero output voltage over the temperature range of minus 100 degrees Fahrenheit to plus 200 degrees Fahrenheit, the output of said bridge circuit being null for only one value of input voltage, any other value of input voltage other than said one value of input voltage causing an output which is an error signal.

References Cited in the file of this patent

UNITED STATES PATENTS

| | | |
|---|---|---|
| 2,316,331 | Hedding | Apr. 13, 1943 |
| 2,447,655 | Kirshbaum | Aug. 24, 1948 |
| 2,715,718 | Holtze | Aug. 16, 1955 |
| 2,769,134 | Hookham | Oct. 30, 1956 |

OTHER REFERENCES

"Nonlinear Circuits," Electronics Magazine, pages 130–136, inclusive, August 1946.